US012602234B1

(12) United States Patent
Tsidon

(10) Patent No.: US 12,602,234 B1
(45) Date of Patent: Apr. 14, 2026

(54) STAGED MEASURED BOOT SEQUENCE OF A COMPUTER

(71) Applicant: Amazon Technologies, Inc., Seattle, WA (US)

(72) Inventor: Erez Tsidon, Moreshet (IL)

(73) Assignee: Amazon Technologies, Inc., Seattle, WA (US)

( * ) Notice: Subject to any disclaimer, the term of this patent is extended or adjusted under 35 U.S.C. 154(b) by 139 days.

(21) Appl. No.: 18/538,432

(22) Filed: Dec. 13, 2023

(51) Int. Cl.
*G06F 9/4401* (2018.01)

(52) U.S. Cl.
CPC .................................. *G06F 9/4408* (2013.01)

(58) Field of Classification Search
CPC .... G06F 9/4408; G06F 9/44505; G06F 21/60; G06F 21/572; G06F 21/577
See application file for complete search history.

(56) References Cited

U.S. PATENT DOCUMENTS

| | | | |
|---|---|---|---|
| 2003/0037231 A1* | 2/2003 | Goodman | G06F 9/4401 |
| | | | 713/2 |
| 2008/0278285 A1* | 11/2008 | Matsushima | G11B 20/00695 |
| | | | 340/5.74 |

| | | | |
|---|---|---|---|
| 2009/0070598 A1* | 3/2009 | Cromer | G06F 21/575 |
| | | | 713/193 |
| 2010/0268967 A1* | 10/2010 | Senda | G06F 21/575 |
| | | | 713/193 |
| 2017/0010881 A1* | 1/2017 | Kawazu | G06F 8/654 |
| 2020/0082091 A1* | 3/2020 | Areno | G06F 9/45558 |

FOREIGN PATENT DOCUMENTS

| | | | | |
|---|---|---|---|---|
| KR | 20220001118 A | * | 1/2022 | G06F 21/604 |

* cited by examiner

*Primary Examiner* — Hyun Soo Kim
(74) *Attorney, Agent, or Firm* — Klarquist Sparkman, LLP

(57) ABSTRACT

In a computer or other electronic device that uses a boot process, it is desirable to allow updating of boot images without impacting objects sealed using trusted keys. In one embodiment, multiple platform configuration registers (PCRs) within a Trusted Platform Module (TPM) are used in association with the booting process. A first PCR can be associated with a first boot image and a second PCR can be associated with a second boot image. A change in the first boot image results in a change of the first PCR value, but the second PCR value can remain unchanged. Accordingly, any objects that are sealed using a trusted key as the second PCR value need not be resealed. Addition PCRs can be added for additional boot images.

18 Claims, 7 Drawing Sheets

Figure 4:
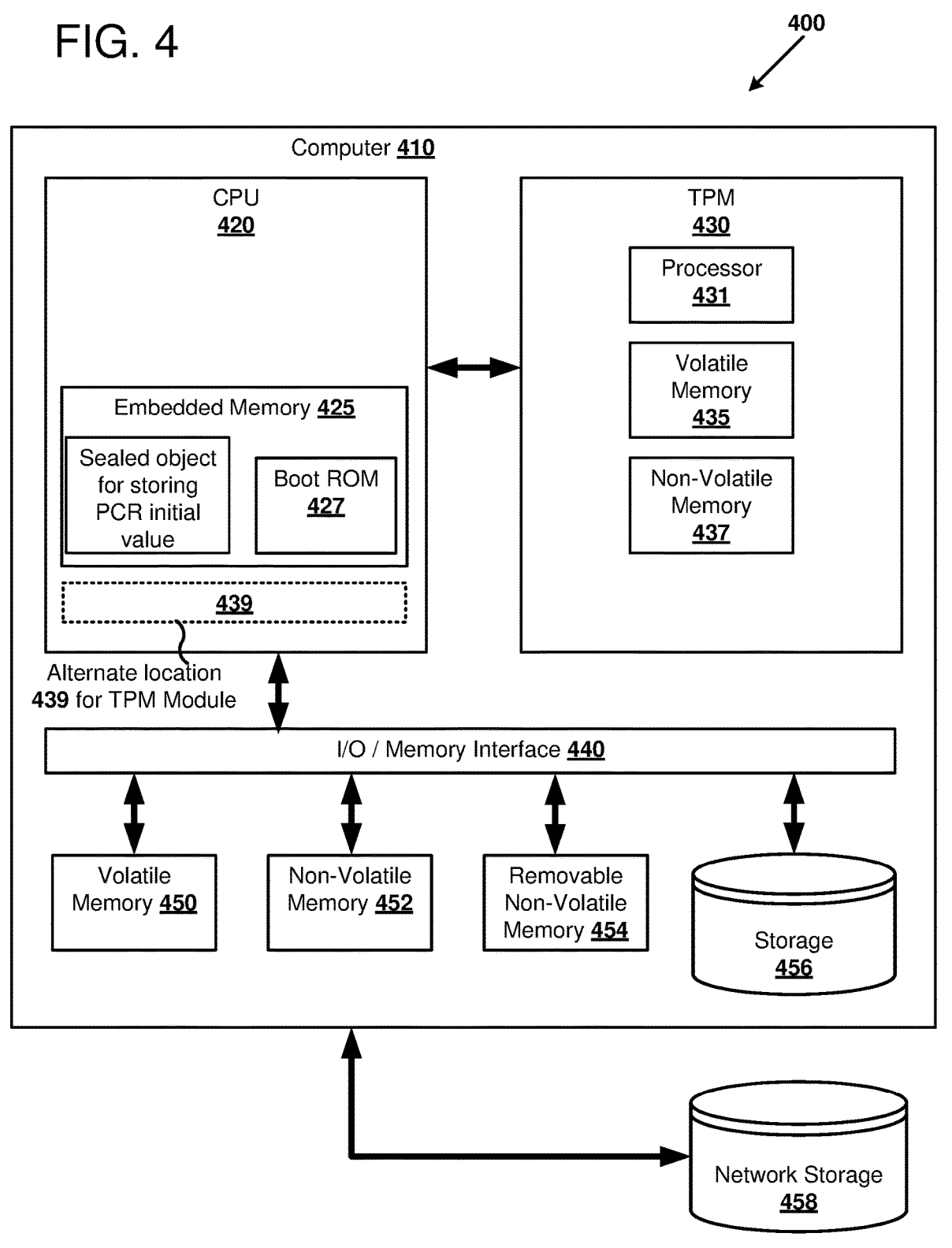

Computer 410

CPU 420

Embedded Memory 425

Sealed object for storing PCR initial value

Boot ROM 427

439

Alternate location 439 for TPM Module

TPM 430

Processor 431

Volatile Memory 435

Non-Volatile Memory 437

I/O / Memory Interface 440

Volatile Memory 450

Non-Volatile Memory 452

Removable Non-Volatile Memory 454

Storage 456

Network Storage 458

FIG. 5

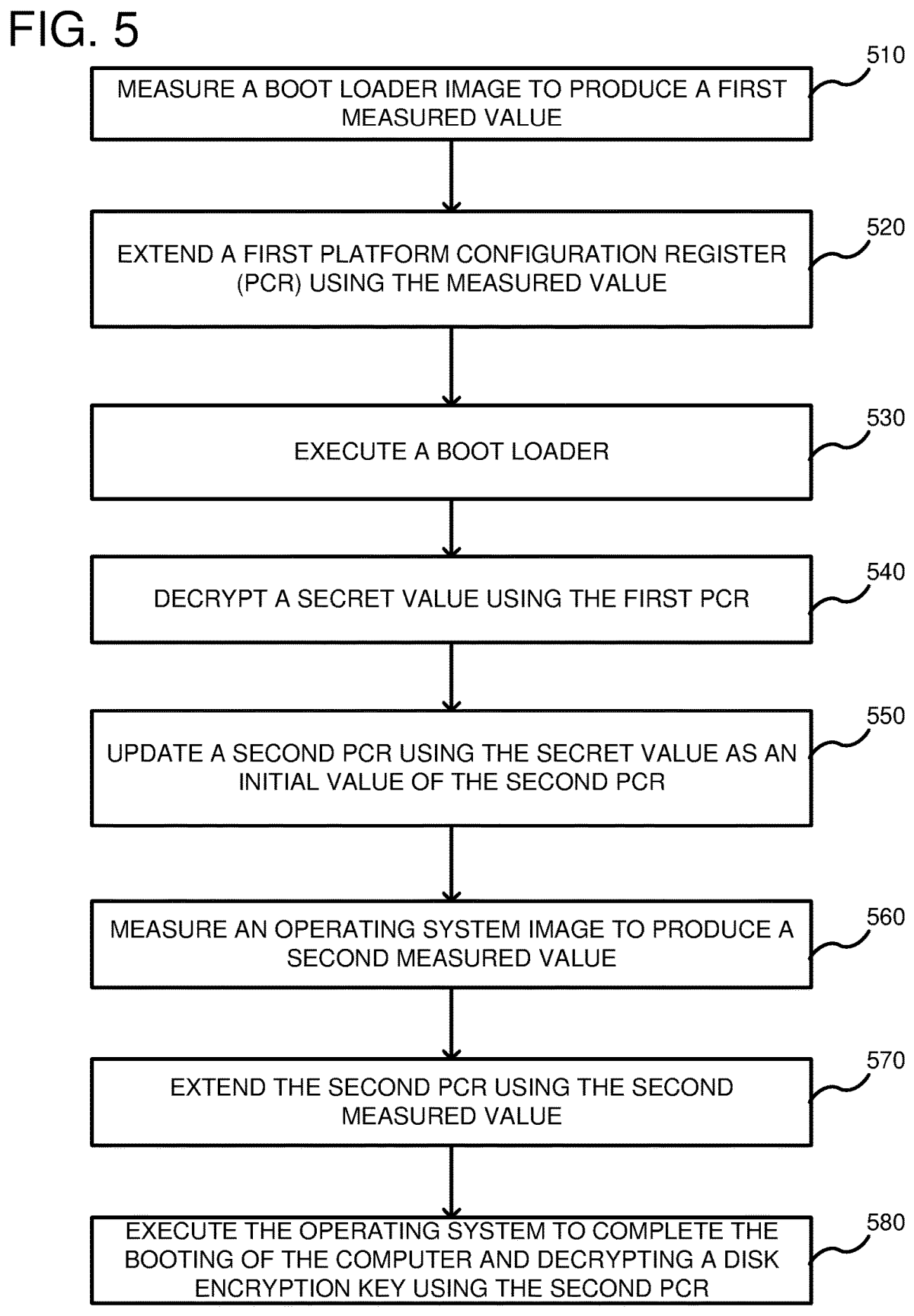

MEASURE A BOOT LOADER IMAGE TO PRODUCE A FIRST MEASURED VALUE — 510

EXTEND A FIRST PLATFORM CONFIGURATION REGISTER (PCR) USING THE MEASURED VALUE — 520

EXECUTE A BOOT LOADER — 530

DECRYPT A SECRET VALUE USING THE FIRST PCR — 540

UPDATE A SECOND PCR USING THE SECRET VALUE AS AN INITIAL VALUE OF THE SECOND PCR — 550

MEASURE AN OPERATING SYSTEM IMAGE TO PRODUCE A SECOND MEASURED VALUE — 560

EXTEND THE SECOND PCR USING THE SECOND MEASURED VALUE — 570

EXECUTE THE OPERATING SYSTEM TO COMPLETE THE BOOTING OF THE COMPUTER AND DECRYPTING A DISK ENCRYPTION KEY USING THE SECOND PCR — 580

DECRYPT A MEMORY LOCATION TO OBTAIN AN INITIAL SECRET VALUE USING A SECRET DEVICE KEY THAT IS DERIVED FROM A BOOT CONFIGURATION REGISTER — 620

RECEIVE A SIGNED MEASURED VALUE OF A BOOT LOADER IMAGE — 630

ENCRYPT THE INITIAL SECRET VALUE USING THE SECRET DEVICE KEY, WHICH IS DERIVED FROM THE SIGNED MEASURED VALUE — 650

COMPUTING ENVIRONMENT 700

730 central processing unit 710 graphics or co-processing unit 715

MEMORY 720

MEMORY 725

COMMUNICATION CONNECTION(S) 770

INPUT DEVICE(S) 750

OUTPUT DEVICE(S) 760

STORAGE 740

SOFTWARE 780 IMPLEMENTING DESCRIBED TECHNOLOGIES

STAGED MEASURED BOOT SEQUENCE OF A COMPUTER

BACKGROUND

A Boot Read-Only Memory (ROM) is typically a non-volatile memory that includes firmware code designed to be executed during the initial booting process of a computer. The ROM is typically embedded in the computer's hardware and is typically read-only, meaning that its contents are written during manufacturing and cannot be modified. The Boot ROM contains a set of instructions or a program that is executed by the device's central processing unit (CPU) when the system is powered on or reset. Its primary purpose is to initialize essential hardware components, perform basic system checks, and load a bootloader program. The bootloader program is used to load an operating system (OS) into the computer's memory during the system startup. The bootloader resides in the computer's firmware or on a separate boot partition on a hard drive. Once the OS is properly loaded and initialized, the computer is ready for normal operation.

Typically, the booting process uses a Trusted Platform Module (TPM), which is a hardware-based security feature that ensures only trusted software is used during the booting process. Process measurement data can be generated for the executable code and used to generate a decryption key. The decryption key is then used to decrypt subsequently executed code. The measurement data can be stored within a platform configuration register (PCR) of the TPM, and the PCR value is not directly observable outside the TPM itself. Updating software involved in the boot sequence has been problematic, especially relating to generating the correct PCR value for software in the boot process that is owned or managed by different teams or entities.

BRIEF DESCRIPTION OF THE DRAWINGS

FIG. 4 is a block diagram of a computer with a trusted platform module (TPM), as can be used in certain examples of the disclosed technology.

FIG. 5 is a flowchart according to one embodiment for booting a system using multiple platform configuration registers.

DETAILED DESCRIPTION

Figure 1:
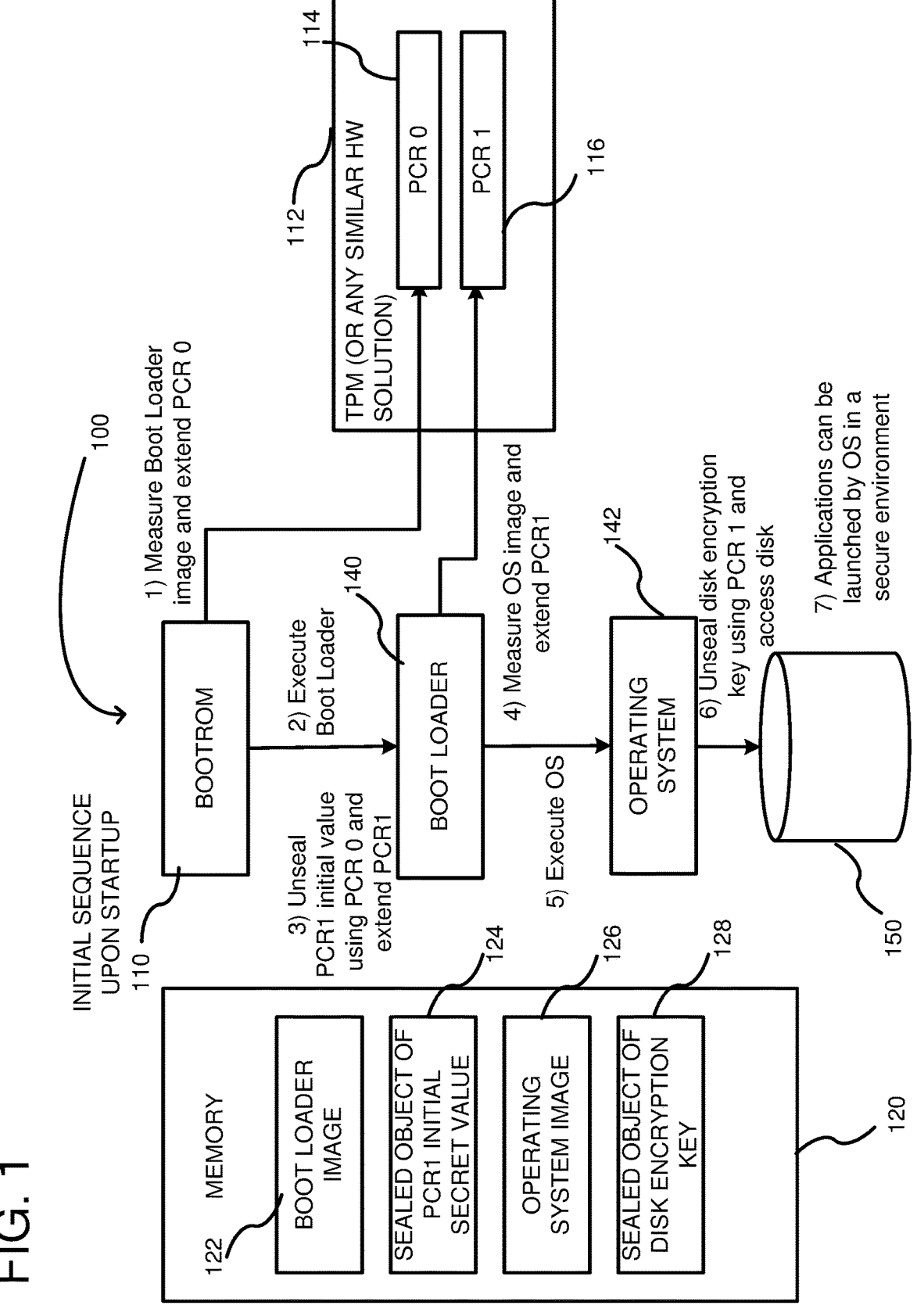
FIG. 1 is a block diagram of a system and a boot sequence upon initialization of the system.

A measured boot process is a term that describes a boot process where each boot phase measures the following boot phase image and stores a corresponding hash value in a Platform Configuration Register (PCR) in a TPM. Any value written to the PCR is concatenated with the currently stored value and then hashed together to create a new PCR value. The final result of the PCR value is the same for every boot sequence assuming the boot images are unchanged. The booted system uses the PCR value to perform an operation that is called seal and unseal. The seal/unseal operation includes using private cryptographic keys that are encrypted with another private key that is hashed with the PCR value. This encryption operation is called "sealing" and the corresponding decryption operation is called "unsealing". In one example, a storage disk encryption key can be sealed against a PCR value and a booted system can unseal the storage disk to access the disk content only if the boot firmware is unchanged. Resealing occurs when an upgrade occurs to the boot firmware that results a different PCR value in the next reboot event. In such a case, all of the sealed objects are unsealed using the current PCR value and then resealed with the new expected PCR value.

During a typical booting process, there are multiple boot images and each of the different boot images can be released by different entities. Any change in one boot image results in a change in the final PCR value. Additionally, any objects sealed using the PCR value should be resealed. Such a resealing of all of the sealed objects (which are controlled by different entities) is difficult to manage and prone to error.

It is desirable to allow updating of boot images without impacting objects sealed using the PCR value. In one embodiment, multiple PCRs are used in association with the booting process. A first PCR can be associated with a first boot image (e.g., boot loader) and a second PCR can be associated with a second boot image (e.g., operating system). A change in the first boot image results in a change of the first PCR value, but the second PCR value can remain unchanged. Accordingly, any objects that are sealed using the second PCR value need not be resealed. Addition PCRs can be added for additional boot images.

Methods and apparatus are disclosed for securing decryption keys in a number of computing environments, including computing environments having access to a trusted platform module (TPM) that can be used to store and generate decryption keys. In some examples, a decryption key stored in the TPM is unsealed and can be used to provide secure boot by using the unsealed key to decrypt executable code executed by the computer during boot. Thus, security attacks that involve unauthorized tampering with executable code, such as surreptitious installation of root kits, can be avoided. Such unauthorized code is often executed at boot time, and can avoid detection by traditional virus scanning or other security tools.

Some examples of the disclosed technology include one or more of three general concepts. The first concept involves adding a new boot stage executable that generates a decryption key by measuring executable code for a central processing unit (CPU) boot read-only memory (ROM) and a boot stage executable. A TPM can be used to process measurement data generated for the executable code and thereby generate a decryption key used to decrypt subsequently executed code. The measurement data is stored within a platform configuration register (PCR) of the TPM, and PCR values are not directly observable outside the TPM itself. It should be noted that the "stored" measurement data is not directly stored within the PCR (a copy of the measurement data is not stored in the PCR), but rather the measurement data is combined with the current value stored in the PCR, and this combined value stored in the PCR, replacing the previously-stored value (so-called "extending" the PCR). The decryption key can be unsealed from the TPM using the measurement value stored in the TPM PCR. The measurement values can be generated by performing a sequence of hash operations with the executable code stored in a boot ROM and executable code of the new boot stage executable itself. The hash operation is selected such that even minor changes (e.g., changing a single bit) results in a different measurement value and thus prevent unsealing of the decryption key. Further, the measurement value stored in the PCR can be destroyed by performing additional operations (e.g., additional extend operations) on the PCR, thereby destroying the measurement value, such that subsequent code executed by the processor cannot unseal the decryption key.

Protecting decryption keys, including decryption keys used to extract executable code, can be difficult, especially in the absence of dedicated hardware. Many computers sold today include a TPM module that is provided as part of integrated circuit implementing a CPU, or as an additional module coupled to a CPU. The TPM can have a key written to its internal non-volatile memory during manufacture or production and sealed with PCR value(s) that capture the system state after running a number of measurement operations with boot executable code. Upon rebooting, the CPU can use the TPM to measure the boot code prior to or as it is executed, unseal the decryption key, use the key to decrypt executable code, delete the key, and destroy any measurement results in order to prevent access to the key by other code executing on the CPU.

FIG. 1 shows a system 100 executing a boot sequence for a first time. The system 100 is typically a computer but can be a cell phone or any other electronic device that runs an operating system and a boot operation. A boot Read Only Memory (ROM) 110, which is typically unchangeable once data has been written to it, is loaded with executable code used to boot the system 100. A TPM 112 is a hardware-based security Integrated Circuit (IC) that allows for efficient security functions, such as encryption and key management. Alternative solutions can be used in place of the TPM, including Trusted Execution Environments (TEEs), Hardware Security Modules (HSMs), Trusted Computing Group (TCG), etc. The TPM 112 includes registers 114, 116 that are PCR 0, 1, respectively. Additional registers can be used. However, in the embodiment of FIG. 1, at least two PCRs should be used.

A memory 120 (shown generically as one memory, but can be a combination of multiple memories), contains a boot loader image 122, a sealed object associated with PCR 1, an operating system image 126 and a sealed object of a disk encryption key 128. The bootloader image 122 is executable code that when executing is shown as a boot loader 140. Likewise, the operating system image is executable code that when executing is shown as operating system 142. A storage device 150, such as a hard drive, can be sealed and not accessible to the operating system 142 without a disk encryption key. The operating system 142 can obtain the disk encryption key from the sealed object 128, but the sealed object needs to be decrypted. The sealed object 124 can be decrypted using PCR 0 114 and, once decrypted, the object is an initial value stored in PCR 1 116. The PCR 1 116 can be used for decrypting the sealed disk encryption key 128.

The boot process starts at (1) where the system 100 is powered on and a processor (not shown) begins executing the bootROM 110. The bootROM 110 measures the boot loader image 122 and extends PCR 0 114. By extending PCR 0 114, it is meant that the PCR 0 is not simply overwritten with the measurement of the boot loader image, but, rather, is a concatenation or combination of a previously stored value and the new value (the measured image). At (2), the bootROM launches the boot loader code. At (3), the boot loader 140 uses PCR 0 114 within the TPM 112 and unseals the object stored at 124. The object stored at 124 is an initial value of PCR 1 116 and the boot loader 140 uses the initial value to extend PCR 1 116. The boot loader 140 then measures the operating system image 126 at (4) and extends PCR 1 116 further using the measurement. At (5), the bootloader 140 launches the operating system 142 using the operating system image 126. Once the operating system 142 is executing, it can access the sealed object 128 using the value stored in PCR 1 116. In this embodiment, the sealed object 128 is a disk encryption key that can be used at (6) to access the hard drive 150. At (7), applications can be launched that operate in a secure environment due to the proper boot sequence.

Figure 2:
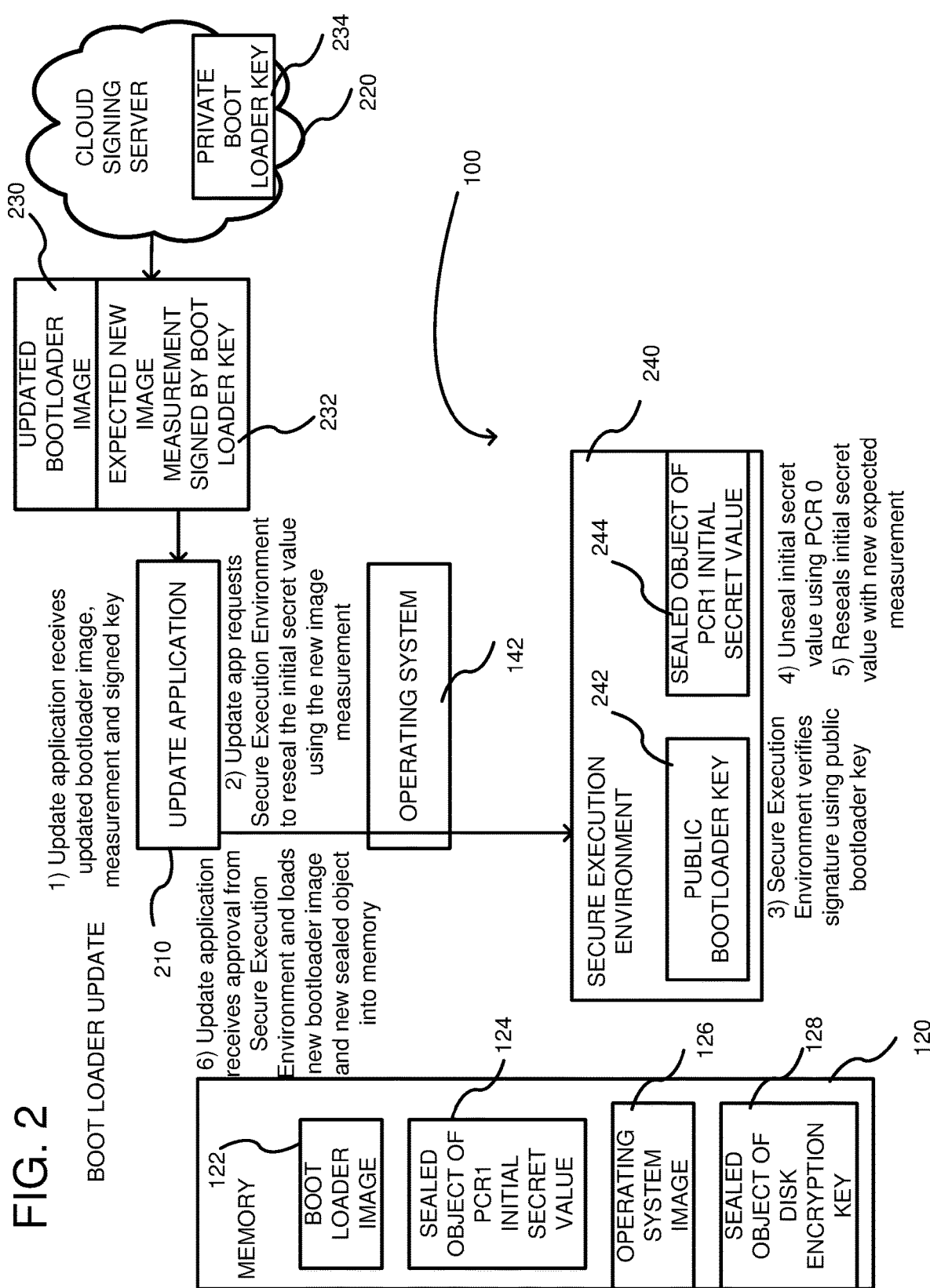
FIG. 2 is a block diagram of the system of FIG. 1, wherein a boot loader is updated and a corresponding initialization sequence with the updated boot loader.

FIG. 2 is the system 100 after the operating system is executing from FIG. 1 and an update application 210 is executing on the operating system 142. A signing server 220 (which can be a server available over a network, such as a cloud signing server) delivers an updated bootloader image 230 and an expected new image measurement 234 signed by a boot image key 234. The transmission of the updated bootloader image 230 can be as a result of a push or pull operation. Thus, at (1), the update application 210 receives the updated bootloader image 230 and the associated measurement 232. At (2), the update application makes a request to a secure execution environment 240 via the operating system 142. The secure execution environment stores a public boot loader key 242 corresponding to the private boot loader key 234. At 244, the secure execution environment 240 also includes a copy of the sealed object 124. At (3), in response to the request from the update application 210, the secure execution environment 240 verifies the signature associated with the expected new image measurement 232 using the public boot loader key 242 corresponding to key 234. At (4), the secure execution environment 240 unseals the initial secret value using PCR (0) (shown in FIG. 1, at 114). At (5), the secure execution environment reseals the initial secret value with the new expected image measurement. At (6), the update application 210 receives approval from the Secure Execution Environment and loads the new boot loader image 230 in place of the boot loader image 122. Additionally, a copy of the sealed object 244 is stored in place of the previously sealed object 124. Notably, the encrypted value in PCR 1 116 remains unchanged and there is no need to re-seal PCR 1. Additionally, the sealed object 128 can remain unchanged and is not resealed. Thus, the boot loader image can be updated without rescaling of all of the PCRs. More particularly, PCR 0 114 is re-sealed but PCR 1 116 is not. Thus, multiple PCRs are used in the boot loading process which allows for updates without updating sealed keys, such as key 128.

Figure 3:
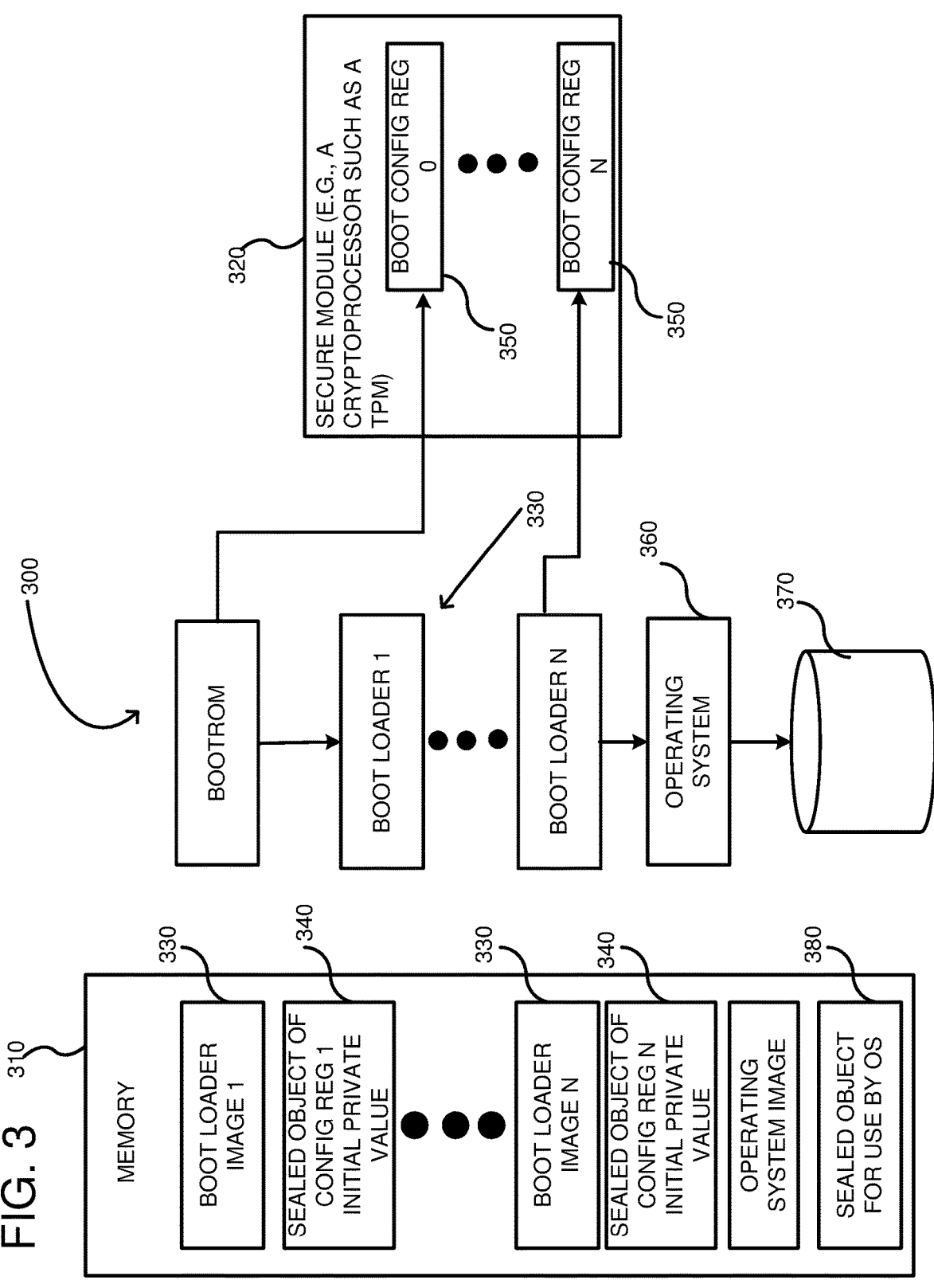
FIG. 3 shows a system according to another embodiment with multiple boot configuration registers used in a booting process.

FIG. 3 shows an embodiment of a system 300 that includes a memory 310 and a secure module 320, such as a cryptoprocessor (e.g., TPM) for securing encryption keys. The boot processes of FIGS. 1 and 2 apply to FIG. 3 but are further extended in FIG. 3 to incorporate N boot loader stages, as shown generally at 330 (wherein N is any integer number). Each boot loader stage 330 can have an associated boot loader image (shown generally at 330) and a sealed object (shown generally at 340). The sealed objects 340 can contain an initial value of the corresponding boot configuration register, shown generally at 350. The boot configuration registers 350 can be PCRs in a TPM, or corresponding registers for alternative technology to TPMs that are available. Thus, any of the intermediate boot loaders 330 can be updated without updating the sealed boot configuration registers 350 for subsequent boot loaders. An operating system 360 can access a sealed object 380 by using the boot configuration register N 350 in order to access a hard drive 370. Updates to any intermediate boot loader 330 does not require an update to one or more sealed objects, such as sealed object 380.

FIG. 4 is a block diagram 400 outlining an example computing environment in which certain examples of the disclosed technology can be implemented. For example, the illustrated computer 410 can be used to perform disclosed methods of securely building a computer including measuring executable code, unsealing an immutable key stored in TPM non-volatile storage, and decrypting executable code, as discussed further below. In some examples, additional portions of a key stored outside of a TPM can be combined in order to form a decryption key. The computer 410 can have secure booting as described above in FIGS. 1-3.

The illustrated computer 410 includes a central processing unit (CPU) 420 that can be used to execute software processes, such as the boot processes described herein. The CPU 420 includes various types of embedded memory 425 including boot ROM 427. The boot ROM 427 is typically physically masked into the CPU design, or programmed using fuses, and cannot be readily altered after the CPU 420 is manufactured. The boot ROM 427 is typically the first code that is executed by the CPU 420 upon initiating execution on boot.

As shown, the CPU 420 is coupled to a trusted platform module (TPM), and includes a number of components, including a processor 431, volatile memory 435, which can include one or more platform configuration registers (PCR), and non-volatile memory 437, which retains its state after turning off power to the memory. Suitable examples of non-volatile memory include non-volatile RAM (NVRAM), electrically erasable programmable read-only memory (EE-PROM), and/or flash memory. Suitable examples of volatile memory include static RAM (SRAM), dynamic RAM (DRAM), registers, latches, flip-flops, or other suitable volatile memory components. A number of different types of TPMs can be used with the disclosed technologies including TPMs manufactured according to the TPM 1.2 standard or the TPM 2.0 standard as defined under the ISO/IEC 11889: 2009 or 11889:2015 standards, respectively. The TPM can provide a root of trust for both reporting and storage functions and can provide limited internal storage for storing data, keys, and for performing operations using PCRs. The PCRs cannot be directly read outside of the TPM. Instead, the PCRs can receive results generated by performing various cryptographic and/or hash functions, for example SHA-1 hashes. In some examples, other hash functions can be used, including SHA-2, SHA-3, RSA, or AES. Data can then be unsealed from the TPM by internally comparing or performing other arithmetic/logic functions with data stored in the PCR, which is combined with the stored key data that has been sealed within the TPM. TPMs may also provide other functions such as random number generation and cryptographic functions.

As shown in FIG. 4, the TPM 430 is provided with a separate integrated circuit that is coupled via an electrical connection to the CPU 420. However, an alternate location 439 for the TPM is indicated where the TPM is provided as part of the integrated circuit implementing the CPU 420. The CPU 420 is further coupled to an I/O and memory interface 440 that controls access and provides data to and from a number of memory and I/O components including volatile memory 450, non-volatile memory 452, removable non-volatile memory 454, and mass storage 456. These storage devices are typically physically coupled to the computer

410. Further, data can also be stored in network storage 458, which is accessed via a wired or wireless network interface. In some examples, some or a portion of decryption keys and executable boot code can be stored in one or more of the storage devices coupled to the computer 410 and/or in network storage 458.

FIG. 5 is a flowchart according to one embodiment for booting a system. In process block 510, a boot loader image is measured to produce a first measured value. For example, in FIG. 1, the boot loader image 122 can be measured by the bootROM 110. Such a measurement can be based upon a hash function or other authentication technique. In process block 520, a first PCR is extended using the measured value. For example, in FIG. 1, the bootROM can use the measured value to extend PCR 0 114. In process block 530, a boot loader can be executed. For example, in FIG. 1, the boot loader 140, which is associated with the boot loader image 122 can be executed, such as by the CPU 420 (FIG. 4). In process block 540, a secret value is decrypted using the first PCR. The "secret" value means simply that it is a secret, non-publicly available value, such as a private key. In FIG. 1, such a secret value is shown at 124, which can be decrypted using PCR 0 114. In process block 550, a second PCR can be updated using the secret value as an initial value. For example, in FIG. 1, the initial secret value stored in the memory location 124 can be used as an initial value of PCR 1 116. In process block 560, an operating system can be measured to produce a second measured value. For example, in FIG. 1, the boot loader 140 can measure the operating system image 126. In process block 570, the second PCR can be extended using the second measured value. Notably, different PCRs are used for different measured values associated with the boot process and the measured values are stored simultaneously. In process block 580, an operating system is executed to complete the boot process. For example, in FIG. 1, the operating system 142 can be executed. Additionally, a disk encryption key can be decrypted using the second PCR. For example, in FIG. 1, the disk encryption key 128 can be decrypted using PCR 1 116. The disk encryption key can then be used by the operating system 142 to access the disk 150.

Figure 6:
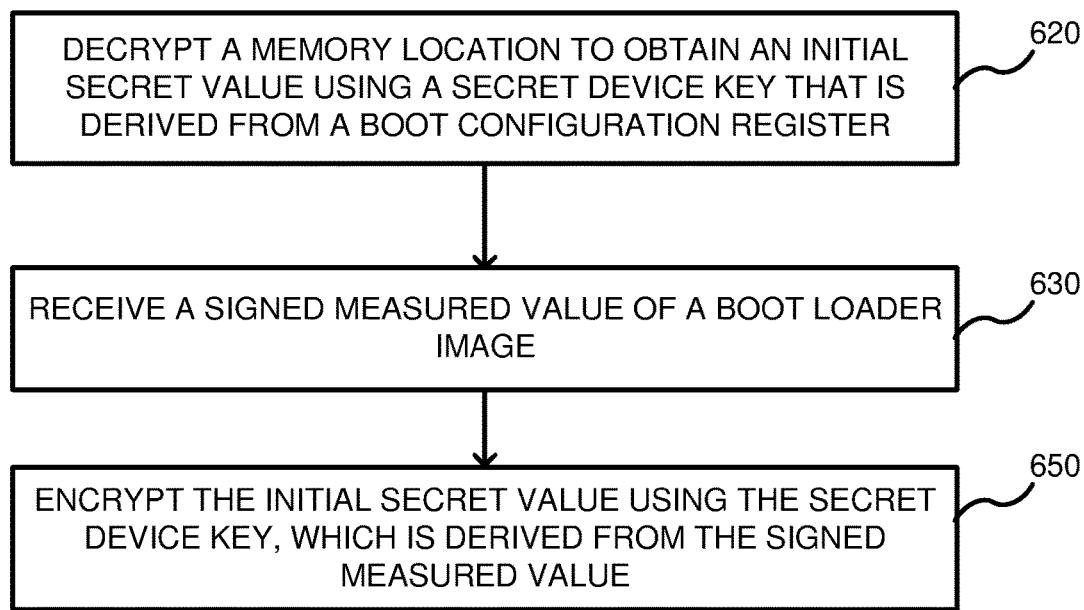
FIG. 6 is a flowchart according to another embodiment for updating a boot loader.

FIG. 6 is a flowchart according to another embodiment. In process block 620, a memory location can be decrypted to obtain an initial secret value using a secret device key derived from a boot configuration register. For example, in FIG. 2, the initial secret value 124 is sealed and can be decrypted by the secure execution environment 240 using a secret device key derived from PCR 0. In process block 630, a signed measured value of a boot loader image is received. For example, in FIG. 2, the signed measured value of the new bootloader image can be received at 232 from the cloud signing server 220. In process block 650, the initial secret value is encrypted using the secret device key, which is derived from the signed measured value. For example, in FIG. 2, the secure execution environment reseals the initial secret value using the signed measured value.

Figure 7:
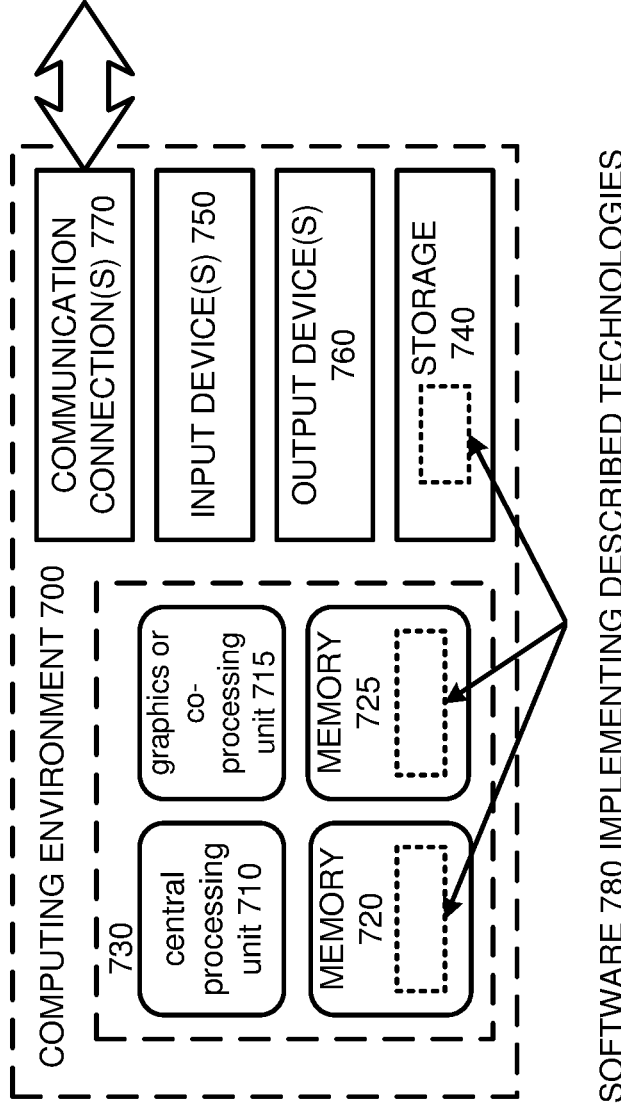
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein. For example, the software 780 can be the update application 210 of FIG. 2 or the bootROM 110 of FIGS. 1 and 2, or the boot loader 140 or 220.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of securely booting a computer comprising a processor and computer memory, the computer being coupled to a trusted platform module (TPM), the method comprising:

measuring a boot loader image using a boot Read Only Memory (ROM) to produce a first measured value;

extending a first platform configuration register (PCR) in the TPM using the first measured value;

executing a boot loader associated with the boot loader image;

using the boot loader, decrypting a secret value in the computer memory using the first PCR;

updating a second PCR by the boot loader using the secret value as an initial value of the second PCR;

measuring an operating system image using the boot loader to produce a second measured value;

extending the second PCR using the second measured value; and executing the operating system to complete the booting of the computer and decrypting a disk encryption key using the second PCR.

2. The method of claim 1, wherein the boot loader image is a first boot loader image, and the method further including updating the first boot loader image with a second boot loader image by:

decrypting the secret value in the computer memory using the first PCR;

replacing the first boot loader image with the second boot loader image;

measuring the second boot loader image;

extending the first PCR with the measurement of the second boot loader image; and resealing the secret value in the computer memory.

3. The method of claim 2, wherein the updating of the first boot loader image is performed by an application executing on the operating system.

4. The method of claim 2, wherein the second PCR is not changed by updating the first boot loader image with the second boot loader image.

5. The method of claim 1, further including using the second PCR to decrypt the disk encryption key.

6. A method, comprising:

decrypting a memory location of a memory to obtain an initial secret value using a secret device key that is derived from a first boot configuration register;

receiving a signed measured value of a boot loader image;

encrypting the initial secret value using the signed measured value;

storing the initial secret value in a second boot configuration register and extending the second boot configuration register with a measurement of an operating system image; and using the second boot configuration register to decrypt an encryption key stored in the memory.

7. The method of claim 6, wherein the boot loader image is a second boot loader image replacing a first boot loader image, and wherein a second boot configuration register remains unchanged after the first boot loader image is updated.

8. The method of claim 6, further including using a separate boot configuration register for each additional boot loader image used in the booting of the computer.

9. The method of claim 6, wherein the boot configuration register is a platform configuration register (PCR) within a trusted platform module (TPM).

10. The method of claim 6, further including measuring an operating system image to obtain a measured value and extending a second boot configuration register after it was extended with the initial secret value.

11. The method of claim 6, wherein the encrypting of the initial secret value is performed by a secure execution environment.

12. A system, comprising:

a first boot configuration register within a secure module of the system;

a second boot configuration register within the secure module of the system;

one or more memories for storing a boot loader image and an operating system image;

a boot Read Only Memory (ROM) for storing executable instructions for measuring the boot loader image to generate a first measured value and for extending the first boot configuration register using the first measured value; and a processor for executing the boot loader image for measuring the operating system image to generate a second measured value and for extending the second boot configuration register using the second measured value, wherein the processor is further configured to use the second boot configuration register to decrypt an encryption key stored in the one or more memories.

13. The system of claim 12, further comprising:

a memory location in the one or more memories for storing an initial value used in the second boot configuration register, wherein the initial value is encrypted in the first boot configuration register.

14. The system of claim 12, wherein the secure module is a trusted platform module (TPM) and wherein the first and second boot configuration registers are platform configuration registers (PCRs) within the TPM.

15. The system of claim 12, wherein the system is a computer or a cellular phone.

16. The system of claim 12, wherein the system is configured to be booted using two or more boot configuration registers with each boot loader of multiple boot loaders being associated with a different boot configuration register.

17. The system of claim 16, wherein the system is configured to update one of the multiple boot loaders without changing one or more of the boot configuration registers.

18. One or more computer-readable media, which are non-transitory, comprising computer-executable instructions that, when executed, cause a computing system to perform a method comprising:

decrypting a memory location to obtain an initial secret value using a secret device key that is derived from a first boot configuration register;

receiving a signed measured value of a boot loader image;

encrypting the initial secret value using the signed measured value;

storing the initial secret value in a second boot configuration register and extending the second boot configuration register with a measurement of an operating system image; and using the second boot configuration register to decrypt an
encryption key stored in a memory.

\* \* \* \* \*